United States Patent [19]

Crossan et al.

[11] Patent Number: 4,889,214

[45] Date of Patent: Dec. 26, 1989

[54] BRAKE AND CLUTCH HUB

[75] Inventors: Jimmey Crossan, Brooksville; Buford Maynard, Gulf Hammock; Dennis Tew, Trenton, all of Fla.

[73] Assignee: Florida Rock Industries, Inc., Jacksonville, Fla.

[21] Appl. No.: 191,572

[22] Filed: May 9, 1988

[51] Int. Cl.⁴ .............................................. F16D 67/02
[52] U.S. Cl. ............................ 192/17 R; 192/113 A; 192/113 B; 188/264 A; 188/264 B
[58] Field of Search .................... 192/17 R, 72, 113 A, 192/113 R; 188/264 A, 264 AA, 264 R

[56] References Cited

U.S. PATENT DOCUMENTS

| | | | |
|---|---|---|---|
| 1,534,538 | 4/1925 | Norris | 188/264 R |
| 2,233,594 | 3/1941 | Eksergian | 188/264 A |
| 2,255,024 | 9/1941 | Eksergian | 188/264 A |
| 2,910,148 | 10/1959 | Ferrell et al. | 188/264 R |

FOREIGN PATENT DOCUMENTS 1184563 12/1964 Fed. Rep. of Germany ...... 188/264

Primary Examiner—Leslie A. Braun
Assistant Examiner—Andrea Pitts
Attorney, Agent, or Firm—Arthur G. Yeager; Earl L. Tyner

[57] ABSTRACT

A circular hub containing an outside brake drum, an inside clutch drum spaced concentrically inward from the brake drum, and a plurality of circumferentially spaced supporting webs rigidly connecting the drums to each other; a plurality of spaced heat conducting fins attached to the inside of the brake drum and spaced away from the clutch drum to reduce the heat conduction from the brake drum to the clutch drum.

19 Claims, 5 Drawing Sheets

4,889,214

BRAKE AND CLUTCH HUB

BACKGROUND OF THE INVENTION

Large machines, such as those used in earth moving applications, frequently include a hub having both a brake drum and a clutch drum that are used to operate the machine. Typical of such a machine is a Lima 2400 dragline having a brake and clutch hub. Both the brake and the clutch may function by clamping and releasing frictional bands against the respective drums. In so doing a large amount of heat is generated and must be dissipated in some fashion or the drum will become damaged, e.g. by heat stress cracking. In the prior art these drums have been designed as two concentric rings separated from each other by, and rigidly connected to each other by spaced radial webs inclined at an angle to the axis of rotation. It was anticipated that the webs would serve as fan blades to cause great volumes of air to pass through between the drums and keep them cool enough to avoid damage by heat stress cracking. This hope has not materialized, and such hubs have been found to have a relatively short life due to heat stress cracking.

It is an object of this invention to provide an improved brake and clutch hub for earth moving machinery. It is another object of this invention to provide a brake and clutch hub which will operate without fear of damaging heat stresses. Still other objects will appear from the more detailed description which follows.

BRIEF SUMMARY OF THE INVENTION

This invention relates to an improved circular hub having an outside drum adapted to cooperate frictionally with a brake band, and an inside drum adapted to cooperate frictionally with a clutch band; where the improvement comprises a plurality of circumferentially spaced radially oriented heat conducting fins between said outside drum and said inside drum, attached in a heat conducting relationship to said outside drum and spaced apart from said inside drum.

In specific preferred embodiments of the hub is rotatable about a central axis wherein said outside drum is a ring with an outside cylindrical surface adapted to cooperate with a brake band which is capable of contracting inwardly to frictionally engage said outside surface; and wherein said inside drum is a ring spaced concentrically inward from said outside drum and having an inside cylindrical surface adapted to cooperate with a clutch band which is capable of expanding outwardly to frictionally engage said inside surface.

In other preferred embodiments the fins are attached to the outside drum, but not to the inside drum; and there are also a plurality of circumferentially spaced air passageways between the two drums.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

This invention can best be understood by reference to the attached drawings.

Figure 2:
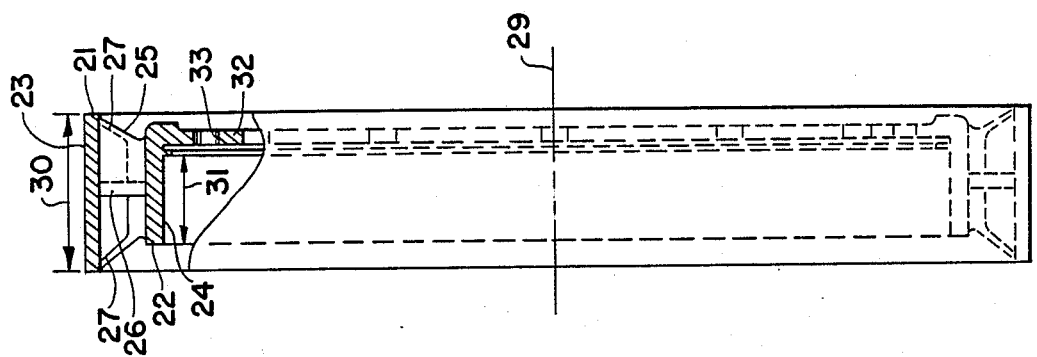
FIG. 2 is a side elevational view of the hub of FIG. 1.
Figure 1:
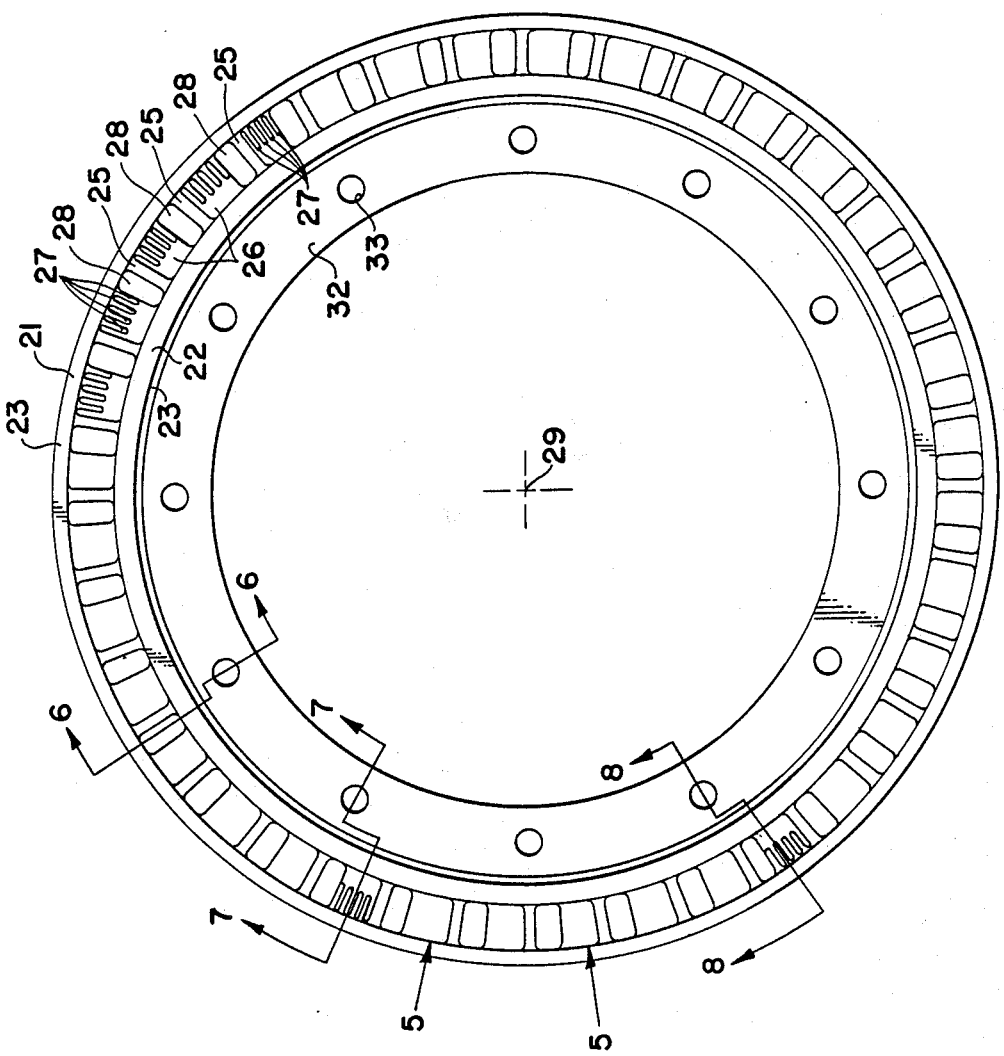
FIG. 1 is a top plan view of the hub of this invention.
Figure 4:
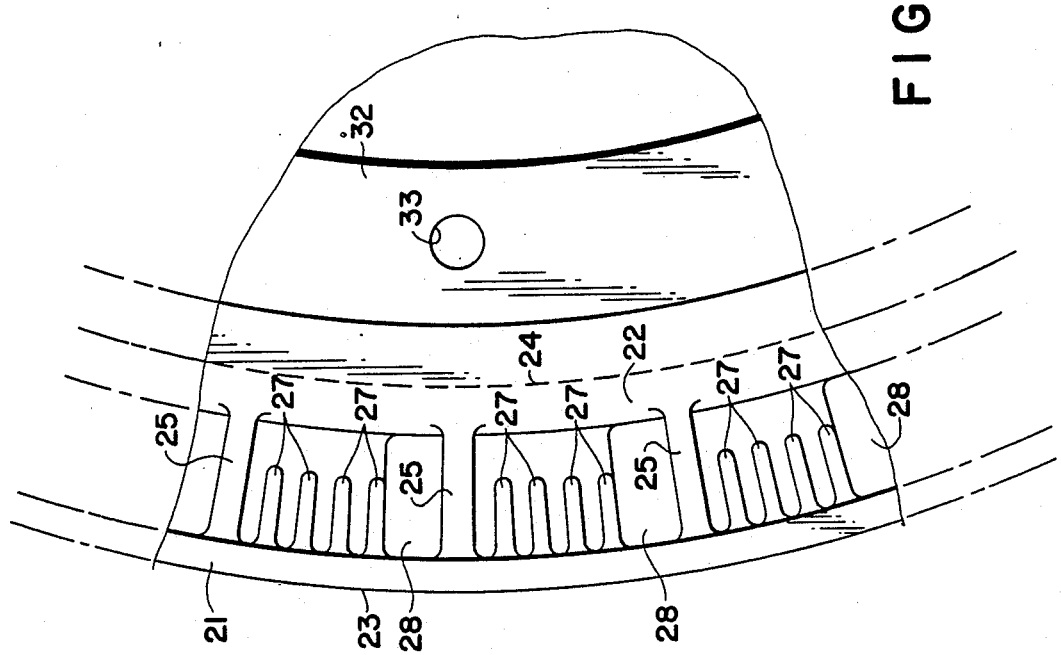
FIG. 4 is an enlarged view of a portion of a bottom plan view of FIG. 1.
Figure 3:
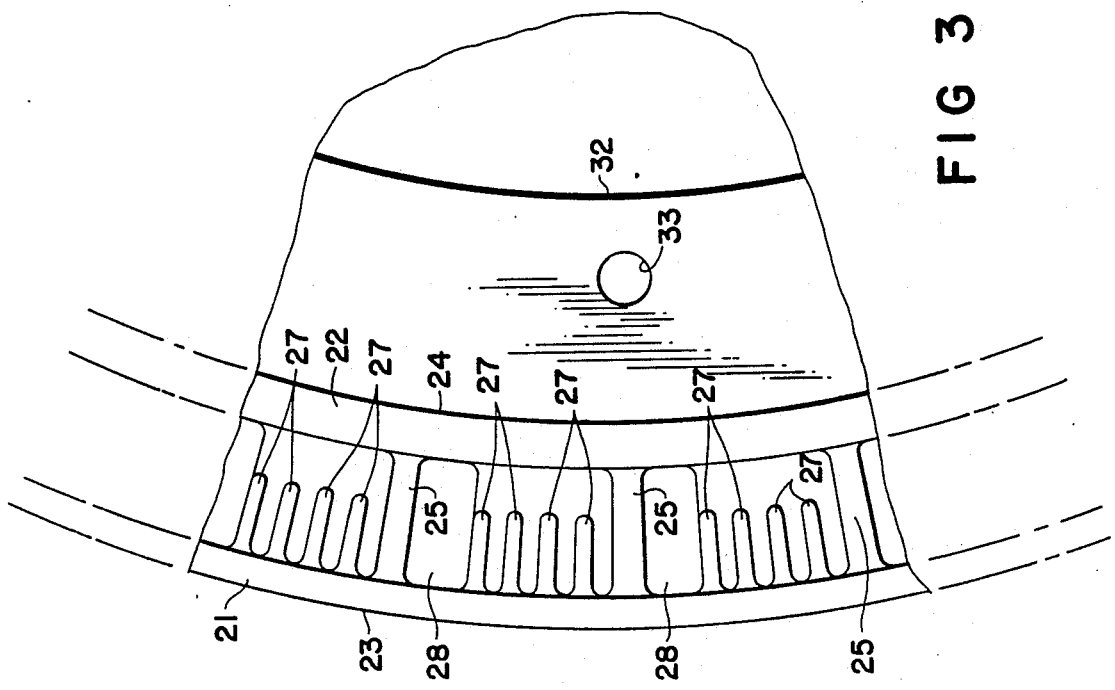
FIG. 3 is an enlarged view of a portion of the top plan view of FIG. 1.

In FIGS. 1-2 there is shown a typical brake and clutch hub having an outside brake drum 21 and an inside clutch drum 22 rigidly joined to each other by a plurality of equally spaced radial supporting webs 25 and a plurality of annular supporting webs 26. Drums 21 and 22 and their supporting webs 25 and 26 are attached to a mounting flange 32 which permits the drums 21 and 22 to be attached by bolts through bolt holes 33 to a fly wheel (not shown) or other structure driven by the machine, e.g. a dragline, to which this hub is attached. Normally such a hub is either cast iron or machined steel.

Brake drum 20 preferably is a cylindrical ring having an outside cylindrical face 23 with a lateral width 30. Surface 23 is engaged by a brake band (not shown) which can be contracted upon outside surface 23 to provide a frictional force tending to stop or prevent the rotation of the hub. Brake bands, as is well known, are designed to be contracted upon or released from the brake drum 21 as desired by the operator.

Clutch drum 22 is operationally similar to brake drum 21. Inside surface 24 faces inwardly and has a lateral width 31 designed to cooperate with a clutch band (not shown) which may be expanded to press against inside surface 24 to provide a frictional force tending to cause the clutch band and any machinery attached thereto to rotate with the rotation of clutch drum 22. In the same manner as with brake bands and brake drum 21, the operator may as desired engage the clutch by expanding the clutch band against inside surface 24 or disengage the clutch by releasing the clutch band.

Figure 11:
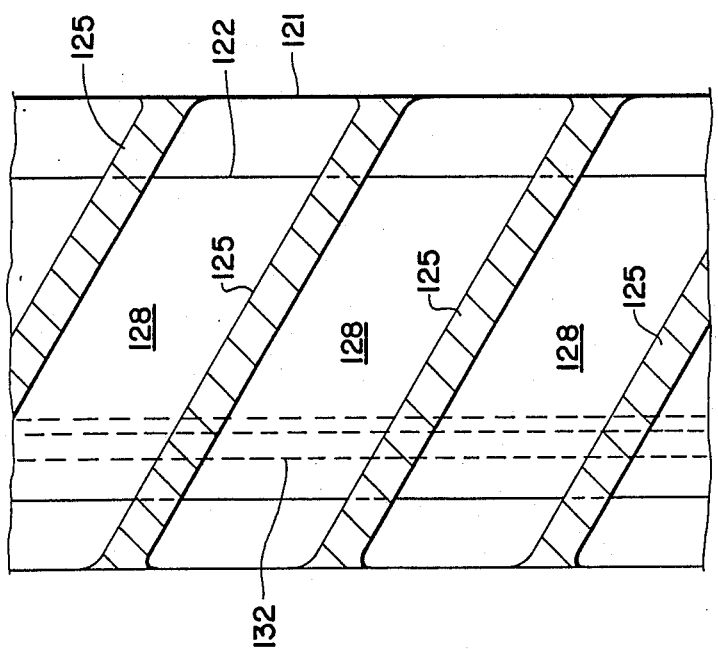
FIG. 11 is a cross sectional view taken at 11—11 of FIG. 9.
Figure 10:
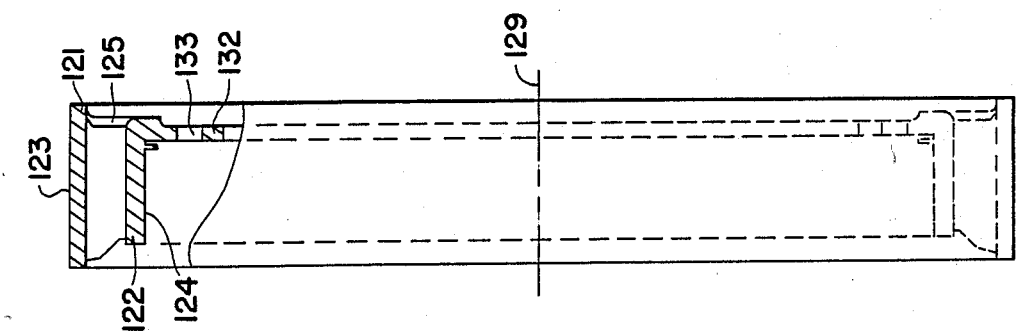
FIG. 10 is a side elevational view of the hub of the prior art.
Figure 9:
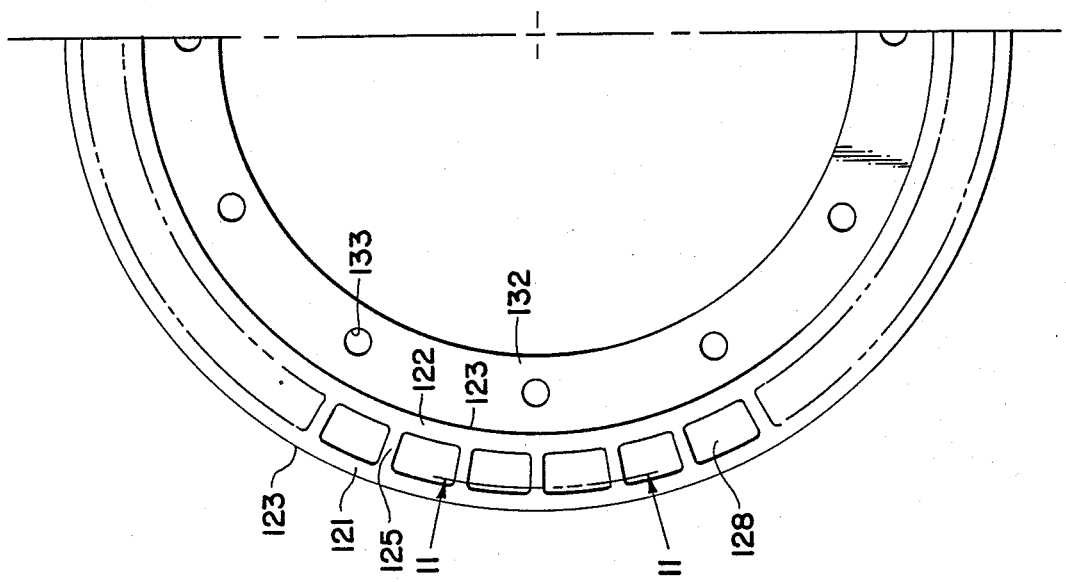
FIG. 9 is a top plan view of the hub of the prior art.

In the prior art as shown in FIGS. 9-11 the hub included brake drum 121, clutch drum 122, radial supporting webs 125, flange 132, and bolt holes 133. Between adjacent webs 125 there was open space 128 for air flow. Webs 125 were included at an angle of about 30° to the centerline 129 of the hub for the purpose of blowing air through spaces 128 after the fashion of rotating fan blades. It was anticipated that such air flow would be sufficient to keep drums 121 and 122 cool enough to operate without interruption, except for ordinary wear and tear. This did not prove to be the case, however. The tremendous heat build-up in brake drum 121 was conducted to the clutch drum 122, and eventually caused destruction of the hub because of heat stress cracking of clutch drum 122. The present invention has eliminated such destructive heat build-up.

In the present design heat conducting fins 27 oriented in a radial direction, and circumferentially spaced apart from each other, have been positioned between brake drum 21 and clutch drum 22. Fins 27 are included between adjacent radial supporting webs 25, and are attached to brake drum 21 but not to clutch drum 22. Fins 27 are also attached to annular webs 26. Thus, there is much cross sectional area, principally due to fins 27, for heat conduction away from drum 21 which, in the normal operation of the machine, has a large heat build-up due to the slippage of the brake band thereon. The cross sectional area for heat conduction from brake drum 21 through radial webs 25 and annular webs 26 to clutch drum 22 is considerably less, although about the same as in the prior art machine.

Furthermore, there is a plurality of air passageways 24 to provide as much cooling air flow as possible. This 28 extending the widths of outside surface 23 and inside surface arrangement of fins 27 and air passageway 28 has been found to provide sufficient cooling to permit brake drum 21 to be made thinner and while clutch drum 22 retains the same thickness as before. The arrangement of annular webs 26 and radial webs 25 provides a better structural strength and heat stress stability to the brake and clutch hub, which translates into a substantially greater usable life.

Figure 5:
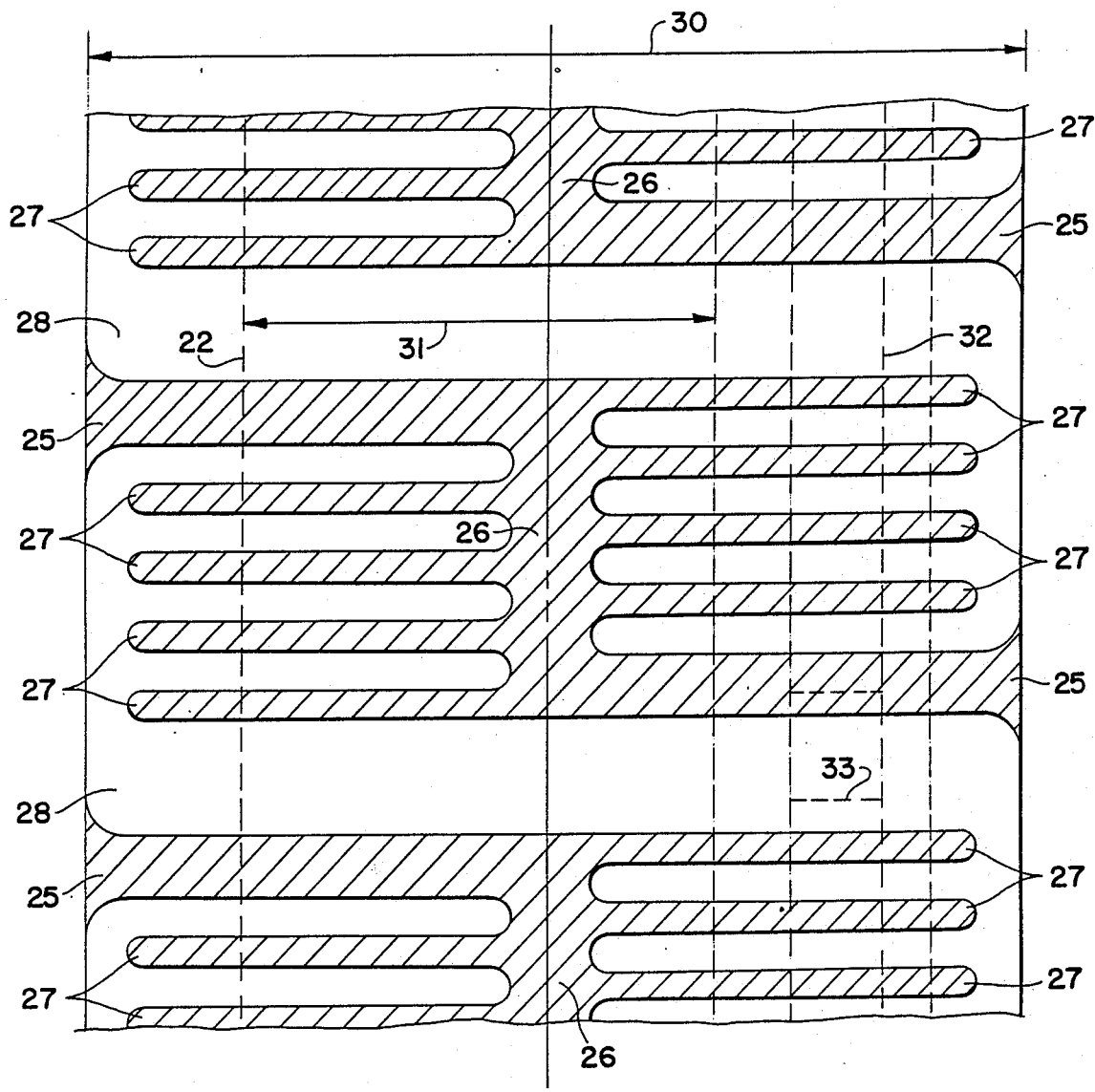
FIG. 5 is an enlarged cross sectional view of a portion of a side elevational view taken at 5—5 of FIG. 1 and with the outside drum removed.
Figure 7:
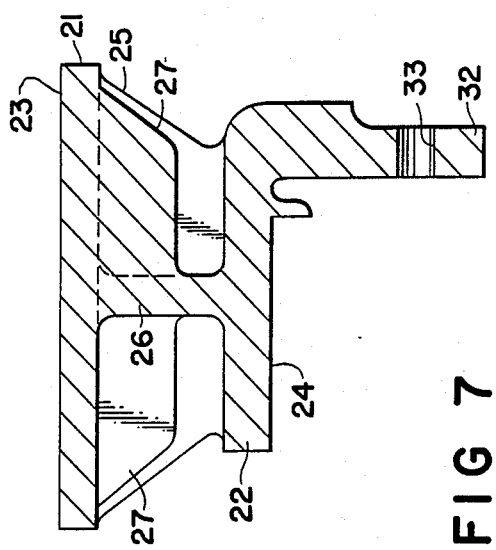
FIG. 7 is a cross sectional view taken at 7—7 of FIG. 1.
Figure 8:
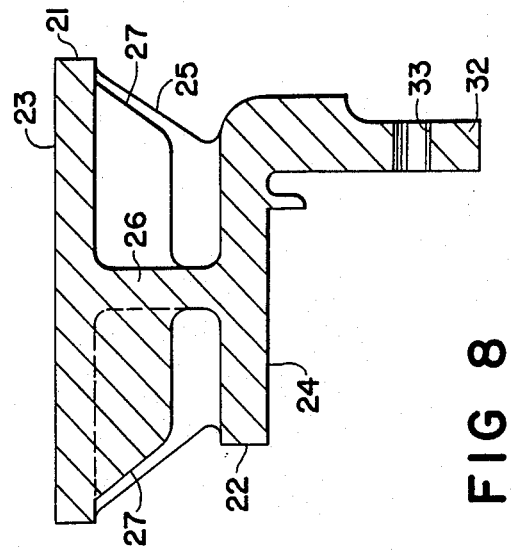
FIG. 8 is a cross sectional view taken at 8—8 of FIG. 1.
Figure 6:
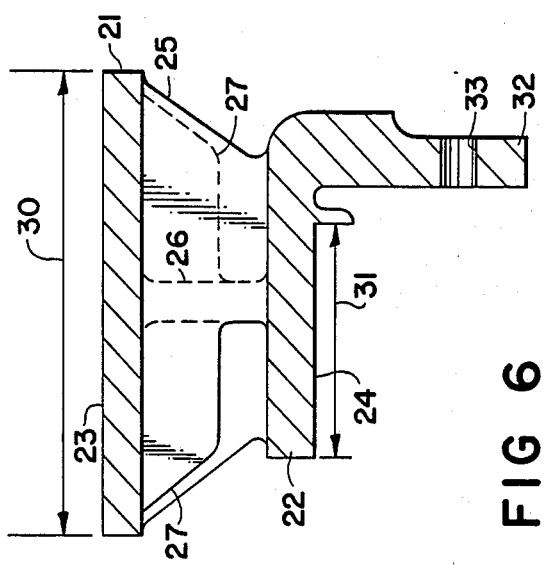
FIG. 6 is a cross sectional view taken at 6—6 of FIG. 1.

In FIGS. 3-8 there are shown the preferred arrangements for fins 27. It may be seen that fins 27 extend laterally outward in opposite directions from both sides of annular web 26. The preferred arrangement for maximum structural strength is for fins 27 to be staggered on opposite sides of annular web 26. This may best be seen in FIG. 5 where an enlarged view of fins 27, annular webs 26, passageways 28, and radial webs 25 is shown. Fins 27 on the right half of FIG. 5 are staggered with respect to fins 27 on the left half of FIG. 5. This arrangement provides a maximum of structural strength around annular web 26, and at the same time provides a maximum in heat conduction from brake drum 21 to fins 27, and thence to the surrounding air. It should be noted that two radial webs 25, one annular web 26 and a plurality of fins 27 (in this case four on each side for a total of eight) and air passageway 28 form a repeating unit that fills the annular space between outside brake drum 21 and inside clutch drum 22. In this instance (as shown in FIGS. 1-2) each repeating unit occupies a 10° space, which means there are 36 such units in a complete hub. Of course, other sizes of units can be employed, such as 8°-15° spaces which is equivalent to 45-24 repeating units. One annular web 26 and two radial webs 25 are preferably joined together to make one integral supporting web having a stairstep shape. Annular web portion 2 lies midway between the two edges of drum 21 and drum 22 perpendicular to axis 29. A radial web 25 is attached at each end of annular web 26 and extending in opposite directions parallel to axis 29. Fins 27 are attached to annular web portion 26.

In FIGS. 9-11 there is shown the prior art hub for a Lima 2400 dragline. The general shape and arrangement of brake drum 121, clutch drum 122 mounting flange 132 and bolt holes 133 is generally the same as that described above. The principal differences lie in the structure of the repeating units in the annular space between brake drum 121 and clutch drum 122. In FIG. 11 it may be seen that brake drum 121 and clutch drum 122 are supported by inclined supporting webs 125. Between adjacent webs 125 is an open space 128 for air passage. In the design of this hub, brake drum 121 and clutch drum 122 are both of the same thickness (1.25 inches) for a hub diameter of 69 inches. As a result of the enhanced cooling of the improved hub of this invention, brake drum 21 has been thinned to 1.0 inch while clutch drum 22 remains at 1.25 inches of thickness.

While it is not intended to limit this invention, but merely to be illustrative, the comparison of a prior art hub and a hub of this invention reveals very interesting data as shown in the following tabulation.

|  | Prior Art | | Invention | |
| --- | --- | --- | --- | --- |
|  | Ref. No. | Area | Ref. No. | Area |
| Cross sectional area, sq. in. of supporting web at brake drum | 125 | 14.8 | 25 and 26 | 12.5 |
| Cross sectional area, sq. in. fins | — | 0 | 27 | 15.0 |
| Total Cross sectional area, sq. in. |  | 14.8 |  | 27.5 |
| Surface area, sq. in. of supporting web | 125 | 114.4 | 26 | 84.6 |
| Surface area, sq. in. of fins | — | 0 | 27 | 154.0 |
| Total surface area, sq. in. |  | 114.4 |  | 238.6 |
| Length of supporting web, inches | 125 | 13.9 | 25 and 26 | 15.5 |

It may be seen that there is approximately twice as much cross sectional area in the present hub structure as compared to the prior art for conducting heat away from brake band 21. There also is approximately twice as much surface area in the present hub structure as compared to the prior art for cooling by convection and radiation. Observations on two hubs, one representing the prior art of FIGS. 9-11 and the other representing the invention of FIGS. 1-8 determined that the brake drum in the hub of this invention was approximately 50% cooler, i.e., approximately 50% more heat was dissipated by the hub of this invention as compared to the prior art hub. In addition to the better heat transfer properties, there also is a better structural support in the present invention as compared to the prior art. In the prior art structure one supporting web 125 extends for 13.9 inches under brake drum 121. In the present invention the supporting webs are a combination of one annular web 26 and two radial webs 25 forming a stairstep shape (as seen in FIG. 5). The total length of that web combination under brake drum 21 is 15.5 inches.

Stress cracking of the clutch drum in the prior art hub was found to occur near the edges of the supporting webs 125 generally in a line parallel to the web 125. It is believed that this was due to the presence of very hot zones in clutch drum 122 where the webs 125 joined clutch drum 122 next to considerably cooler zones in the portions of clutch drum 122 between adjacent webs 125. The very hot brake drum 121 and very hot webs 125 tend to expand outwardly away from clutch drum 122. Similarly, stresses are produced between the very hot zones of clutch drum 122 near webs 125 and the cooler zones between adjacent webs 125. These stresses cause the cracking to occur. The design of the present hub eliminates the linear supporting webs and substitutes the stairstep design of one annular web 26 and two radial webs 25, effectively spreading the hot zones out over a greater area and not having such well defined alternating linear zones of hot and cold that caused the problem in the prior art. Furthermore, fins 27 transfer heat to the surrounding air and materially reduce the heat conduction to clutch drum 122, making the resulting hot and cold zones in clutch drum 122 not so widely divergent.

The combination of a better heat transfer and better structural support has permitted the hub of the present invention to employ a thinner brake drum 21 (1.0 inch) as compared to brake drum 121 (1.25 inch) of the prior art.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a circular hub having an outside drum having an outward planar surface adapted to cooperate frictionally with a brake band and an inside drum having an inner planar surface adapted to cooperate frictionally with a clutch band; the improvement which comprises a plurality of circumferentially spaced, radially oriented heat conducting fins between said outside drum and said inside drum, said fins being attached in a heat conducting relationship to said outside drum and being unattached and spaced apart from said inside drum whereby heat generated in said outward planar surface of said outside drum by a brake band is not conducted to said inside drum.

2. The hub of claim 1 which additionally comprises a plurality of circumferentially spaced passageways for air between said outside drum and said inside drum.

3. The hub of claim 1 which is rotatable about a central axis wherein said outside drum is a ring with an outside cylindrical surface adapted to cooperate with a brake band which is capable of contracting inwardly to frictionally engage said outside surface; and wherein said inside drum is a ring spaced concentrically inward from said outside drum and having an inside cylindrical surface adapted to cooperate with a clutch band which is capable of expanding outwardly to frictionally engage said inside surface.

4. The hub of claim 3 wherein said fins are attached to the inside of said outside drum and extend radially inward therefrom.

5. The hub of claim 4 which additionally comprises a plurality of circumferentially spaced air passageways extending through said hub in a direction generally parallel to said central axis.

6. The hub of claim 1 which additionally comprises a plurality of spaced radial supporting webs rigidly connecting outside drum to said inside drum.

7. The hub of claim 3 additionally comprising a plurality of circumferentially spaced annular supporting webs rigidly connecting said outside drum to said inside drum at a position generally medial of each said drum; with said fins being in heat conducting connections with said annular webs and said outside drum and extending outwardly toward the lateral edges of said outside drum.

8. The hub of claim 7 wherein the fins on one side of said annular supporting webs are staggered with respect to the fins on the other side of said annular supporting webs.

9. A rotatable circular hub having an axis of rotation, an outside cylindrical surface and an inside cylindrical surface concentrically spaced apart from each other; said cylindrical surfaces having lateral widths capable of cooperating with frictional bands adapted to be releasably pressed separately against said surfaces, said outside surface facing outwardly and said inside surface facing inwardly with respect to said axis; said outside surface being rigidly connected to said inside surface by a plurality of equally spaced radial supporting webs and a plurality of equally spaced annular webs; a plurality of spaced radial fins between adjacent radial supporting webs heat conductingly connected to said outside surface and said annular webs and spaced apart from said inside surface, and a plurality of circumferentially spaced unobstructed air passageways between said outside surface and said inside surface and extending in a direction generally parallel to said axis over the entire said lateral widths of said cylindrical surfaces.

10. The hub of claim 9 wherein said outside surface is adapted to cooperate with a brake band and said inside surface is adapted to cooperate with a clutch band.

11. The hub of claim 9 wherein said outside cylindrical surface is the outside surface of an outside ring and said inside cylindrical surface is the inside surface of an inside ring which is concentrically spaced apart from said outside ring with said supporting webs connecting said rings and said fins and air passageways being positioned between said rings.

12. The hub of claim 9 wherein said fins on one side of said annular web are staggered with respect to said fins on the other side of said annular web.

13. A rotatable circular hub having an axis of rotation, an outside ring having an outside cylindrical surface facing outwardly with respect to said axis and an inside ring having an inside cylindrical surface facing inwardly with respect to said axis, said rings being concentrically spaced apart from each other; said cylindrical surfaces having lateral widths adapted to cooperate with frictional bands which are releasably pressed separately and respectively against said surfaces; said outside ring being rigidly connected to said inside ring by a plurality of equally spaced radial supporting webs generally parallel to said axis and a plurality of equally spaced annular webs positioned perpendicularly to and medially of said radial webs; a plurality of equally spaced radial fins parallel to and between adjacent radial supporting webs heat conductingly connected to said outside ring and said annular webs and spaced apart from said inside ring, and a plurality of circumferentially equally spaced unobstructed air passageways between said outside ring and said inside ring and extending in a direction generally parallel to said axis over the entire said lateral widths of said rings.

14. The hub of claim 13 wherein said outside surface is adapted to cooperate with a brake band and said inside surface is adapted to cooperate with a clutch band.

15. The hub of claim 13 wherein said fins on one side of said annular web are radially staggered with respect to said fins on the other side of said annular area.

16. The hub of claim 13 wherein each said air passageway is bordered in a direction parallel with respect to said axis on one side by one of said radial webs and on the other side by one of said fins.

17. The hub of claim 13 wherein said radial supporting webs and said annular webs are heat conductingly joined into a plurality of equally spaced integral supporting webs having a general stairstep shape with said annular web being positioned midway between the outer edges of said outside surface and said inside surface, generally perpendicular to both said surfaces and extending circumferentially for the length of said annular web; one of said radial webs at each end of said annular web, one of said radial webs extending from one end of said annular web to one edge of said outside and inside surfaces and the other one of said radial webs extending from the other end of said annular web to the other edge of said outside and inside surfaces.

18. The hub of claim 17 wherein the annular space between said outside ring and said inside ring is a plurality of repeating zones, each said zone including one of said integral supporting webs, with a plurality of said radial fins extending outwardly from said annular web, and one of said air passageways.

19. The hub of claim 18 which contains 36 of said repeating zones filling said entire annular space.

* * * * *